(12) United States Patent
Lee et al.

(10) Patent No.: US 11,606,702 B2
(45) Date of Patent: Mar. 14, 2023

(54) ELECTRONIC DEVICE AND METHOD FOR ADJUSTING ADJUSTABLE ANTENNA

(71) Applicants: Li-Chun Lee, Taipei (TW); Shih-Chia Liu, Taipei (TW); Jhin-Ciang Chen, Taipei (TW); Jui-Hung Lai, Taipei (TW); Peng-Hsiang Sung, Taipei (TW); Hsiang-Pin Yang, Taipei (TW); Sheng-Ju Yu, Taipei (TW); Kuan-Ting Chen, Taipei (TW); Hung-Han Sun, Taipei (TW)

(72) Inventors: Li-Chun Lee, Taipei (TW); Shih-Chia Liu, Taipei (TW); Jhin-Ciang Chen, Taipei (TW); Jui-Hung Lai, Taipei (TW); Peng-Hsiang Sung, Taipei (TW); Hsiang-Pin Yang, Taipei (TW); Sheng-Ju Yu, Taipei (TW); Kuan-Ting Chen, Taipei (TW); Hung-Han Sun, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 168 days.

(21) Appl. No.: 16/986,282

(22) Filed: Aug. 6, 2020

(65) Prior Publication Data
US 2021/0219148 A1 Jul. 15, 2021

Related U.S. Application Data

(60) Provisional application No. 62/884,155, filed on Aug. 7, 2019.

(51) Int. Cl.
*H04W 16/28* (2009.01)
*H04W 84/12* (2009.01)

(52) U.S. Cl.
CPC ............ *H04W 16/28* (2013.01); *H04W 84/12* (2013.01)

(58) Field of Classification Search
CPC .............................. H04W 16/28; H04W 84/12
(Continued)

(56) References Cited

U.S. PATENT DOCUMENTS

| 2014/0086077 A1* | 3/2014 | Safavi | H04W 24/02 |
| | | | 370/252 |
| 2015/0092573 A1* | 4/2015 | Zhang | H04B 7/024 |
| | | | 370/252 |

(Continued)

FOREIGN PATENT DOCUMENTS

| CN | 106301463 | 1/2017 |
| EP | 3358905 | 8/2018 |

(Continued)

OTHER PUBLICATIONS

Office Action of Taiwan Counterpart Application, dated Mar. 17, 2021, pp. 1-6.

*Primary Examiner* — Obaidul Huq
(74) *Attorney, Agent, or Firm* — JCIPRNET

(57) ABSTRACT

An electronic device and a method for adjusting an adjustable antenna are provided. The electronic device includes a storage medium, an antenna switch, a wireless local area network (WLAN) card, and a processor. The storage medium stores multiple system modules. The antenna switch is coupled to the adjustable antenna. The WLAN card is coupled to the antenna switch and obtains a communication signal from the adjustable antenna. The communication signal includes channel information. The processor is coupled to the storage medium, the antenna switch, and the WLAN card. The processor accesses and executes the multiple system modules including an operation system (OS) and a signal capturing module. The OS obtains the (Continued)

channel information from the WLAN card. The signal capturing module obtains the channel information from the OS and configures the antenna switch according to the channel information to adjust the antenna performance of the adjustable antenna.

4 Claims, 2 Drawing Sheets

(58) Field of Classification Search
USPC .......................................... 370/310, 328, 338
See application file for complete search history.

(56) References Cited

U.S. PATENT DOCUMENTS

| | | | | |
|---|---|---|---|---|
| 2015/0289247 | A1* | 10/2015 | Liu | H04B 7/0632 |
| | | | | 370/329 |
| 2016/0301138 | A1 | 10/2016 | Hwang et al. | |
| 2017/0279507 | A1* | 9/2017 | Kim | H04B 7/0456 |

FOREIGN PATENT DOCUMENTS

| | | | |
|---|---|---|---|
| TW | I396327 | 5/2013 | |
| WO | 2010085889 | 8/2010 | |
| WO | WO-2013089790 A1 * | 6/2013 | ............. H01Q 1/243 |

* cited by examiner

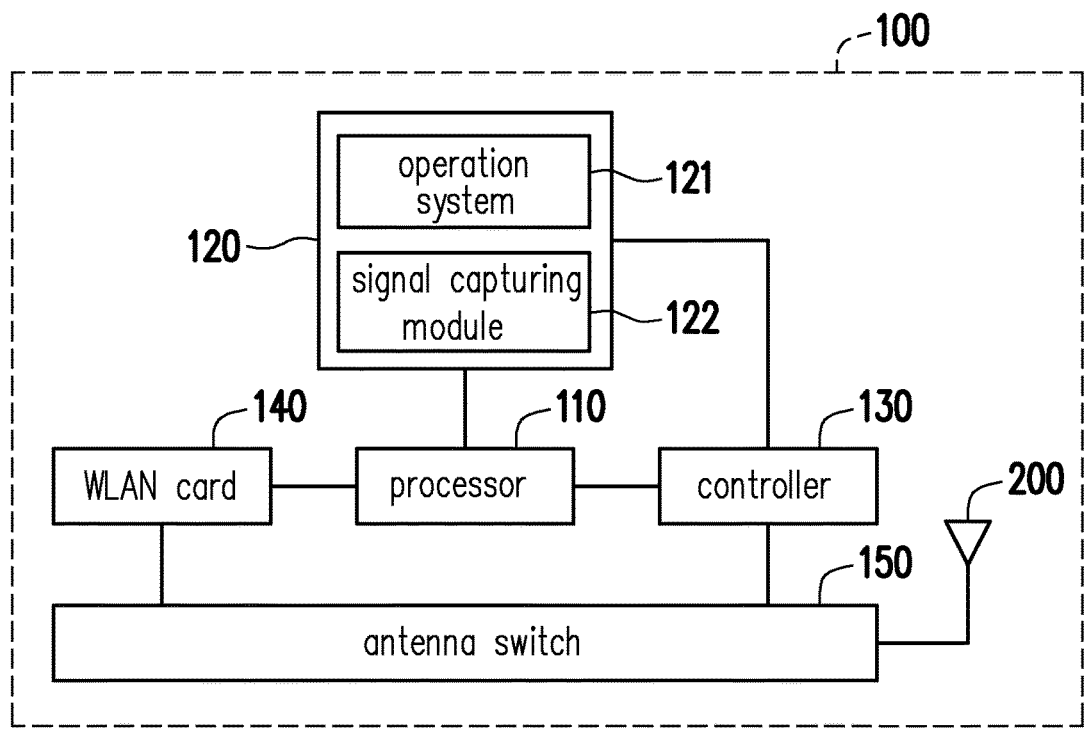

FIG. 2

| Multiple system modules are pre-stored in a storage medium, and the multiple system modules include an operation system and a signal capturing module | S301 |

↓

| A wireless local area network (WLAN) card is coupled to an antenna switch, and a communication signal is obtained from the adjustable antenna coupled to the adjustable antenna. The communication signal includes channel information | S302 |

↓

| The processor is coupled to the storage medium, the antenna switch, and the WLAN card; meanwhile the processor accesses and executes the multiple system modules; the operation system obtains the channel information from the WLAN card; and the signal capturing module obtains the channel information from the operation system and configures the antenna switch according to the channel information to adjust the antenna performance of the adjustable antenna | S303 |

FIG. 3

ELECTRONIC DEVICE AND METHOD FOR ADJUSTING ADJUSTABLE ANTENNA

CROSS-REFERENCE TO RELATED APPLICATION

This application claims the priority benefit of U.S. provisional application Ser. No. 62/884,155, filed on Aug. 7, 2019. The entirety of the above-mentioned patent application is hereby incorporated by reference herein and made a part of this specification.

BACKGROUND

Technical Field

The disclosure relates to an electronic device and a method for adjusting an adjustable antenna.

Description of Related Art

When designing a product such as a laptop, the design of the metal casing with no window often leads to the need to increase the distance between the antenna and the metal casing due to the problem of insufficient bandwidth in designing the Wi-Fi antenna. This will increase the thickness of the product and affect the appearance of the product. When trying not to increase the thickness of the product, the problem of insufficient bandwidth will emerge and affect the antenna performance. In order to dynamically adjust the antenna performance, an adjustable antenna may be disposed in the product, and the bandwidth of the antenna can be increased by adjusting the adjustable antenna.

FIG. 1 illustrates a schematic view of a laptop with an adjustable antenna. When the laptop communicates with an external access point through the antenna, the wireless local area network (WLAN) card obtains a communication signal from the adjustable antenna and transmits the communication signal to a wireless local area network (WLAN) driver in an operation system layer. The WLAN driver decodes the communication signal to generate channel information between the laptop and the external access point. After generating the channel information, the WLAN driver decides how to adjust the adjustable antenna according to the channel information. Then, the WLAN driver instructs a central processor unit to control the antenna switch to adjust the adjustable antenna through a basic input/output system (BIOS) code in a firmware layer. In this way, the laptop can dynamically adjust the adjustable antenna to adapt to the channel environment.

However, the supply of the WLAN driver required to adjust the adjustable antenna often needs the assistance of WLAN card manufacturers, so designers need the full cooperation of the WLAN card manufacturers in designing a product such as a laptop.

SUMMARY

The disclosure provides an electronic device and a method for adjusting an adjustable antenna capable of adjusting the adjustable antenna without adopting a wireless local area network (WLAN) driver.

An electronic device for adjusting an adjustable antenna includes a storage medium, an antenna switch, a wireless local area network (WLAN) card, and a processor. The storage medium stores multiple system modules. The antenna switch is coupled to the adjustable antenna. The WLAN card is coupled to the antenna switch and obtains a communication signal from the adjustable antenna. The communication signal includes channel information. The processor is coupled to the storage medium, the antenna switch, and the WLAN card. The processor accesses and executes the multiple system modules. The multiple system modules include an operation system and a signal capturing module. The operation system obtains the channel information from the WLAN card. The signal capturing module obtains the channel information from the operation system and configures the antenna switch according to the channel information to adjust an antenna performance of the adjustable antenna.

In an embodiment of the disclosure, the electronic device further includes a controller. The controller is coupled to the processor, the storage medium, and the antenna switch. The signal capturing module instructs the controller to configure the antenna switch to adjust the antenna performance of the adjustable antenna.

In an embodiment of the disclosure, the processor enters a sleep state after the signal capturing module obtains the channel information, and the controller configures the antenna switch to adjust the antenna performance of the adjustable antenna after the processor enters the sleep state.

In an embodiment of the disclosure, the controller configures the antenna switch through general purpose input/output (GPIO) commands.

A method for adjusting an adjustable antenna of the disclosure includes the following operations. Multiple system modules are pre-stored in a storage medium. The multiple system modules include an operation system and a signal capturing module. A wireless local area network (WLAN) card is coupled to an antenna switch, and a communication signal is obtained from the adjustable antenna coupled to the adjustable antenna. The communication signal includes channel information, and a processor is coupled to the storage medium, the antenna switch, and the WLAN card. The processor accesses and executes the multiple system modules. The operation system obtains the channel information from the WLAN card. The signal capturing module obtains the channel information from the operation system and configures the antenna switch according to the channel information to adjust an antenna performance of the adjustable antenna.

In an embodiment of the disclosure, the method further includes the following operations. A controller is coupled to the processor, the storage medium, and the antenna switch, and the signal capturing module instructs the controller to configure the antenna switch to adjust the antenna performance of the adjustable antenna.

In an embodiment of the disclosure, the method further includes the following operations. The processor enters a sleep state after the signal capturing module obtains the channel information, and the operation in which the signal capturing module instructs the controller to configure the antenna switch to adjust the antenna performance of the adjustable antenna includes that the controller configures the antenna switch to adjust the antenna performance of the adjustable antenna after the processor enters the sleep state.

In an embodiment of the disclosure, the operation in which the signal capturing module instructs the controller to configure the antenna switch to adjust the antenna performance of the adjustable antenna includes that the controller configures the antenna switch through general purpose input/output (GPIO) commands.

Based on the above, the disclosure is capable of accurately obtaining the channel information and adjusting the adjustable antenna without being affected by various brands of the wireless local area network (WLAN) cards.

BRIEF DESCRIPTION OF THE DRAWINGS

FIG. 2 illustrates a schematic view of an electronic device and an adjustable antenna according to an embodiment of the disclosure.

FIG. 3 illustrates a flowchart of a method for adjusting an adjustable antenna according to an embodiment of the disclosure.

DESCRIPTION OF THE EMBODIMENTS

Figure 1:
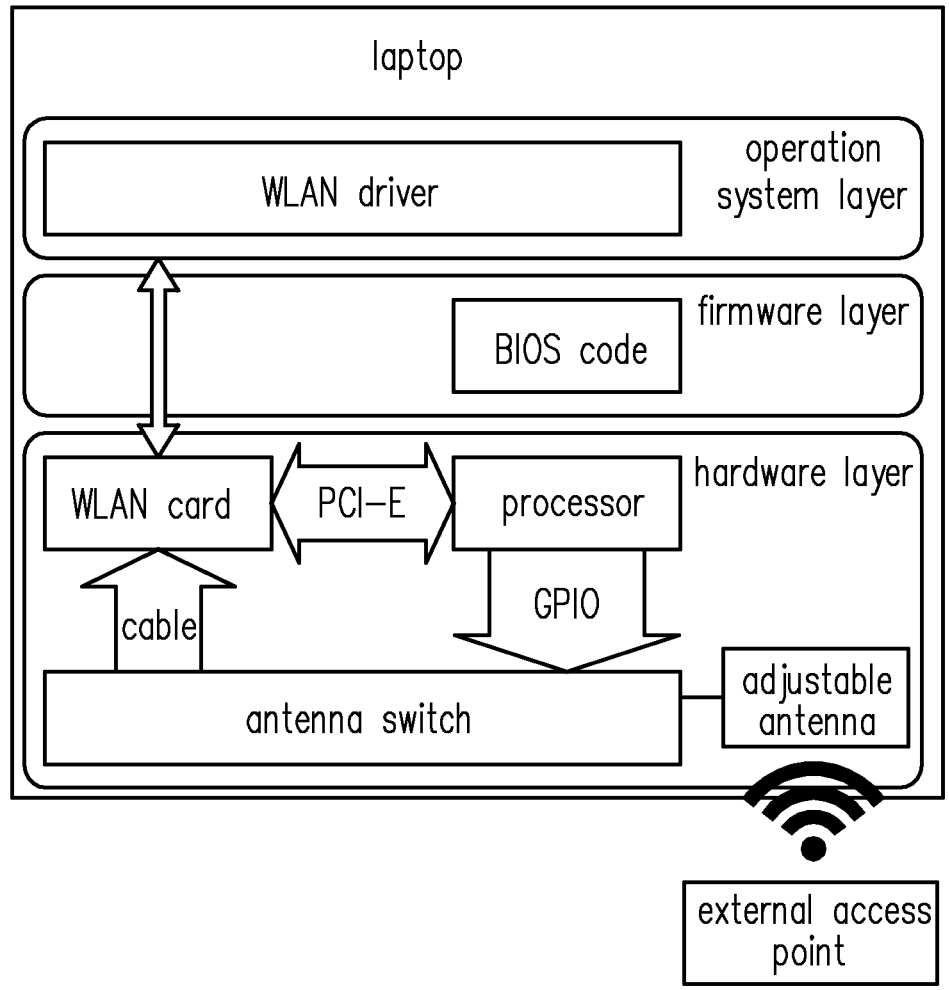
FIG. 1 illustrates a schematic view of a laptop with an adjustable antenna.

FIG. 2 illustrates a schematic view of an electronic device 100 according to an embodiment of the disclosure. The electronic device 100 includes a processor 110, a storage medium 120, a controller 130, a wireless local area network (WLAN) card 140, an antenna switch 150, and an adjustable antenna 200.

The processor 110 is, for example, a central processing unit (CPU). The processor 110 is coupled to the storage medium 120, the controller 130, and the WLAN card 140; and the processor is capable of accessing and executing multiple system modules and various signal capturing modules stored in the storage medium 120.

The storage medium 120 is, for example, any type of fixed or movable random access memory (RAM), read-only memory (ROM), flash memory, a hard disk drive (HDD), a solid state drive (SSD), similar elements, or a combination thereof. The storage medium 120 is configured to store the multiple system modules or the various signal capturing modules that are executed by the processor 110. In the embodiment, the storage medium 120 stores the multiple system modules including the operation system 121, the signal capturing module 122, and the like. The functions of which are illustrated in the following.

The controller 130 is, for example, a programmable general-purpose or special-purpose micro-control unit, a microprocessor, a digital signal processor, a programmable controller, a special application integrated circuit, a graphics processor, a video signal processor, an image processing unit, an arithmetic logic unit, a complex programmable logic device, a field programmable logic gate array, other similar elements, or a combination thereof. The controller 130 is coupled to the processor 110, the storage medium 120, and the antenna switch 150; and the controller 130 is adapted to configure the antenna switch 150 to adjust the frequency response of the adjustable antenna 200. The controller 130 configures the antenna switch 150 through general purpose input/output (GPIO) commands.

The WLAN card 140 is coupled to the processor 110 and the antenna switch 150 and has the function of transmitting or receiving wireless communication signals. The output signal formats of different types of the WLAN card 140 may be different. The communication protocol supported by the WLAN card 140 may include, but is not limited to, mobile networks, Wi-Fi, or Bluetooth.

The antenna switch 150 is configured in the adjustable antenna 200 to change the antenna performance of the adjustable antenna 200, and the antenna performance may include, but is not limited to, parameters such as bandwidth, gain, frequency response, or radiation pattern.

The adjustable antenna 200 is configured to transmit or receive a communication signal. After the adjustable antenna 200 receives the communication signal, the WLAN card 140 obtains the communication signal from the adjustable antenna 200 through the antenna switch 150, and the communication signal may include channel information. Then, the operation system 121 obtains the channel information from the WLAN card 140. The channel information may include, but is not limited to, information such as frequency response, gain, or phase offset, or the like. Regardless of the type or the brand of the WLAN card 140, the operation system 121 is capable of generating the channel information in the same format according to the communication signal output by the WLAN card 140.

The signal capturing module 122 obtains the channel information from the operation system 121 and instructs the controller 130 to configure the antenna switch 150 according to the channel information so that the antenna performance of the adjustable antenna 200 is adjusted. The controller 130 configures the antenna switch 150 through a tuning code.

In an embodiment, the controller 130 may adjust the antenna performance of the adjustable antenna 200 when the processor 110 is in a sleep state. Specifically, after the signal capturing module 122 obtains the channel information and instructs the controller 130 to adjust the antenna performance of the adjustable antenna 200 according to the channel information, the processor 110 enters the sleep state. The controller 130 configures the antenna switch 150 to adjust the antenna performance of the adjustable antenna 200 after the processor 110 enters the sleep state.

FIG. 3 illustrates a flowchart of a method for adjusting an adjustable antenna according to an embodiment of the disclosure, and the method may be implemented by the electronic device 100 shown in FIG. 2. In step S301, the multiple system modules are pre-stored in the storage medium, and the multiple system modules include the operation system and the signal capturing module. In step S302, the WLAN card is coupled to the antenna switch, and the communication signal is obtained from the adjustable antenna coupled to the adjustable antenna. The communication signal includes the channel information. In step S303, the processor is coupled to the storage medium, the antenna switch, and the WLAN card; meanwhile the processor accesses and executes the multiple system modules; the operation system obtains the channel information from the WLAN card; and the signal capturing module obtains the channel information from the operation system and configures the antenna switch according to the channel information to adjust the antenna performance of the adjustable antenna.

Based on the above, the disclosure is capable of obtaining the channel information from the WLAN card through the operation system. The signal capturing module obtains the channel information from the operation system, and thus how to adjust the frequency response of the adjustable antenna is determined according to the channel information. Since the signal capturing module obtains the channel information from the operation system, in the case that the operation system is capable of obtaining the channel information of various brands of the WLAN cards, the disclosure is capable of accurately obtaining the channel information and adjusting the adjustable antenna without being affected by the brands of the WLAN cards.

What is claimed is:

1. An electronic device for adjusting an adjustable antenna, comprising:
   a storage medium storing a plurality of system modules;
   an antenna switch coupled to the adjustable antenna;
   a wireless local area network (WLAN) card coupled to the antenna switch and obtaining a communication signal from the adjustable antenna, wherein the communication signal comprises channel information;
a processor coupled to the storage medium, the antenna switch, and the wireless local area network (WLAN) card, and accessing and executing the plurality of system modules, wherein the plurality of system modules comprise:
an operation system generating formatted channel information according to the channel information obtained from the wireless local area network (WLAN) card; and
a signal capturing module obtaining the formatted channel information from the operation system and configuring the antenna switch according to the formatted channel information to adjust an antenna performance of the adjustable antenna; and
a controller coupled to the processor, the storage medium, and the antenna switch, wherein the signal capturing module instructs the controller to configure the antenna switch to adjust the antenna performance of the adjustable antenna, wherein
the processor enters a sleep state after the signal capturing module obtains the formatted channel information, and the controller configures the antenna switch to adjust the antenna performance of the adjustable antenna after the processor enters the sleep state.

2. The electronic device according to claim 1, wherein the controller configures the antenna switch through general purpose input/output (GPIO) commands.

3. A method for adjusting an adjustable antenna, comprising:
enabling a storage medium to pre-store a plurality of system modules, wherein the plurality of system modules comprise an operation system and a signal capturing module;
coupling a wireless local area network (WLAN) card to an antenna switch and obtaining a communication signal from the adjustable antenna coupled to the adjustable antenna, wherein the communication signal comprises channel information;

coupling a processor to the storage medium, the antenna switch, and the wireless local area network (WLAN) card, and enabling the processor to access and execute the plurality of system modules, wherein the operation system generates formatted channel information according to the channel information obtained from the wireless local area network (WLAN) card, and the signal capturing module obtains the formatted channel information from the operation system and configures the antenna switch according to the formatted channel information to adjust an antenna performance of the adjustable antenna;

coupling a controller to the processor, the storage medium, and the antenna switch;

enabling the processor to enter a sleep state after the signal capturing module obtains the formatted channel information; and enabling the signal capturing module to instruct the controller to configure the antenna switch to adjust the antenna performance of the adjustable antenna, comprising:

enabling the controller to configure the antenna switch to adjust the antenna performance of the adjustable antenna after the processor enters the sleep state.

4. The method according to claim 3, wherein the operation of enabling the signal capturing module to instruct the controller to configure the antenna switch to adjust the antenna performance of the adjustable antenna further comprises:
enabling the controller to configure the antenna switch through general purpose input/output (GPIO) commands.

* * * * *